United States Patent

[11] 3,619,085

| [72] | Inventors | Christopher Nuss<br>Warren;<br>Thomas A. Phillips, Troy, both of Mich. |
|---|---|---|
| [21] | Appl. No. | 812,211 |
| [22] | Filed | Apr. 1, 1969 |
| [45] | Patented | Nov. 9, 1971 |
| [73] | Assignee | Chrysler Corporation<br>Highland Park, Mich. |

[54] HYDRAULIC PUMP
11 Claims, 4 Drawing Figs.

[52] U.S. Cl. .................................................. 417/223,
417/300
[51] Int. Cl. .................................................. F04b 1/26,
F04b 49/00
[50] Field of Search ........................................... 103/23;
230/150; 417/223, 47, 300

[56] References Cited
UNITED STATES PATENTS

| 596,928 | 1/1898 | Wiedenbauer | 230/152 |
| 1,291,875 | 1/1919 | Herr | 230/15 |
| 2,387,346 | 10/1945 | Pennington | 192/3.5 |
| 2,408,851 | 10/1946 | Hillier et al. | 103/23 |
| 2,577,285 | 12/1951 | Stephan | 103/23 |
| 2,855,761 | 10/1958 | Jacobs | 230/15 |
| 3,155,040 | 11/1964 | Shurts et al. | 103/23 |
| 3,071,211 | 1/1963 | Wrigley | 103/23 |
| 3,445,057 | 5/1969 | Sutaruk | 192/58 X |
| 3,072,058 | 1/1963 | Christopher et al. | 417/47 |
| 3,104,530 | 9/1963 | Teichert | 60/525 |

*Primary Examiner*—William L. Freeh
*Attorney*—Harness, Talburtt and Baldwin

ABSTRACT: The fluid pressures at opposite sides of a metering orifice in the outlet of a hydraulic pump are employed to regulate the power operating the pump and, in cooperation with the size of the orifice, to predetermine the volume output of the pump.

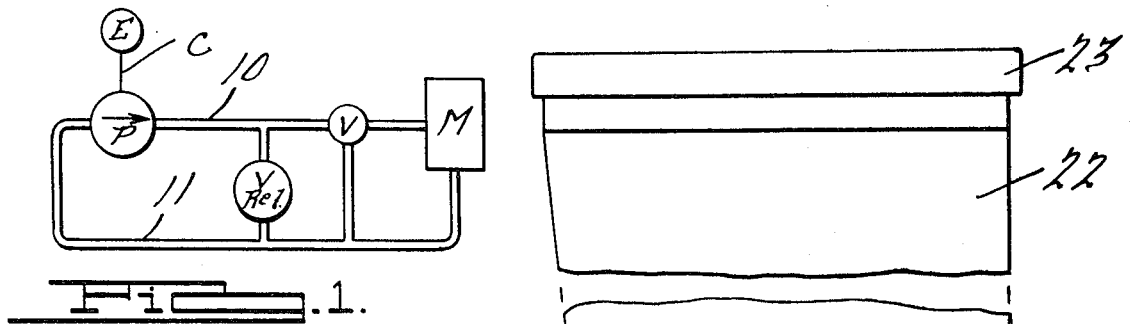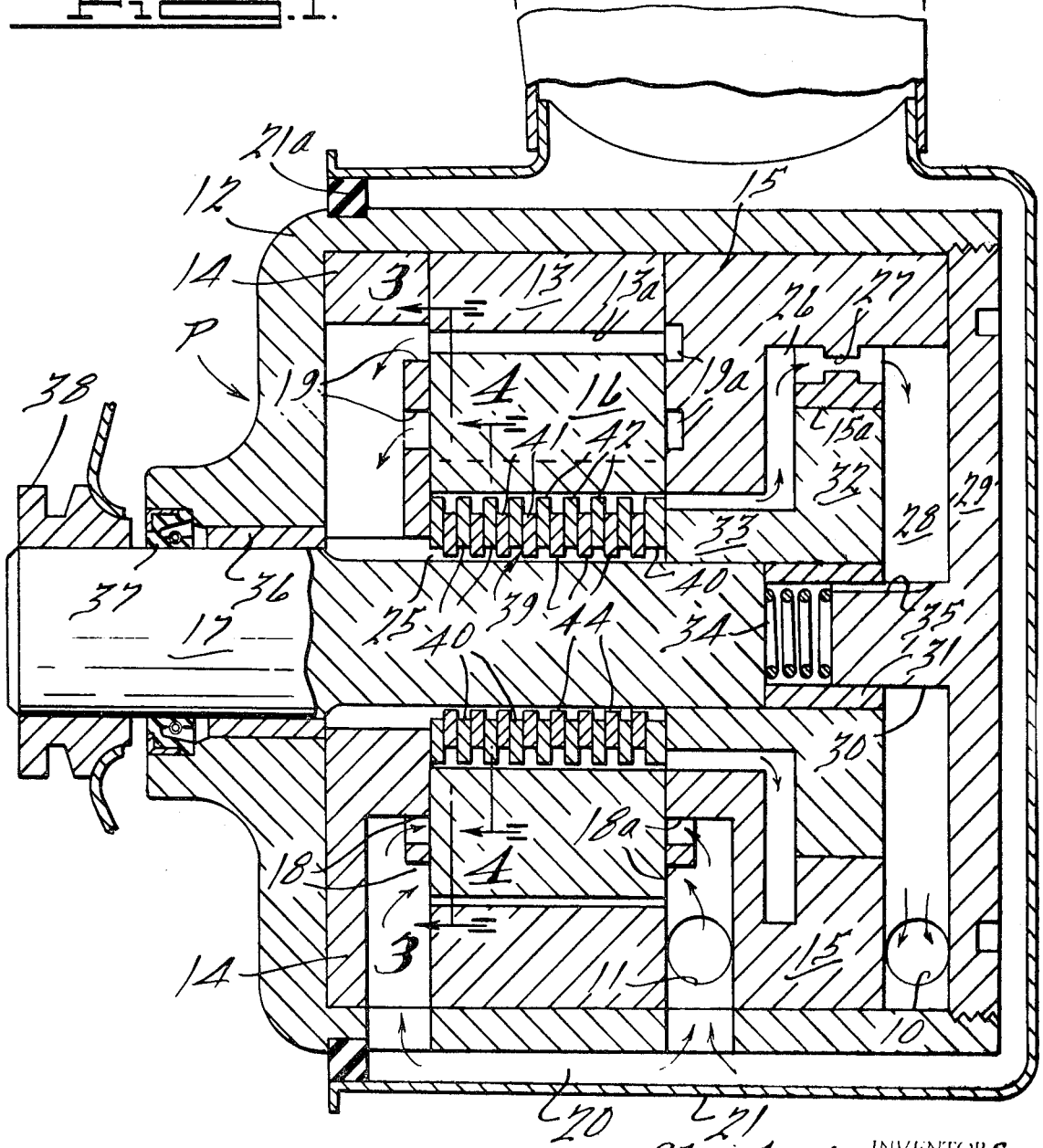

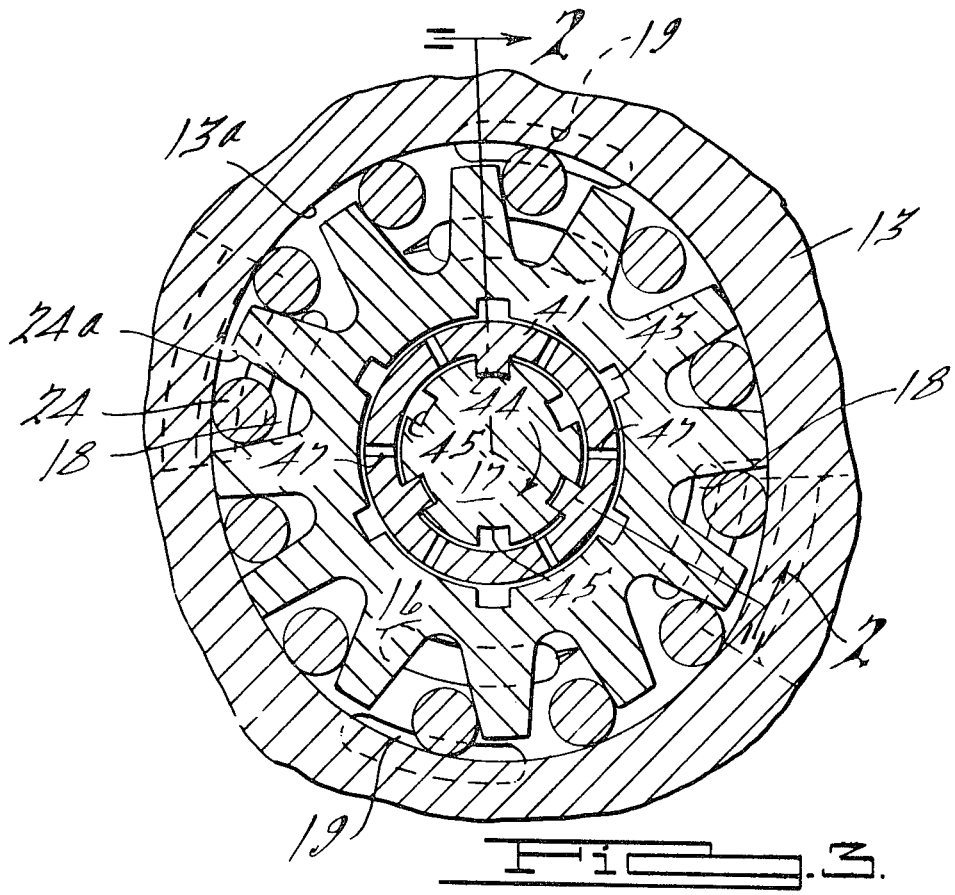

3,619,085

HYDRAULIC PUMP

BACKGROUND AND SUMMARY OF THE INVENTION

This invention relates to hydraulic pumps particularly of the constant displacement type adapted to be driven by a source of power that may vary appreciably and independently of the load or power demand on the pump, wherein the pump is usually operated at low to moderate load conditions and is only occasionally and for short time intervals operated at high or maximum loads, as for example in an automobile power-steering mechanism wherein the pump driven by the automobile engine supplies hydraulic power for a steering motor, and the maximum load on the steering motor occurs when the vehicle is traveling at low speed.

Heretofore it has been common in automobile power-steering systems to provide a flow control valve for supplying the necessary portion of the pump output to the steering motor and directing the excess pump output through a bypass duct to the pump inlet. A high volume of fluid flow thus had to be accommodated during high-speed operation of the automobile engine, with consequent inefficiency of operation and overheating of the fluid. Furthermore, the pump must necessarily be designed to operate at high efficiency during slow speed conditions in order to supply the demand for maximum steering power at low speed. At high speed, such efficiency is entirely unnecessary because the pump output is near its maximum and the load or power demand is a minimum.

In order to minimize the pump speed at high engine speeds, a low ratio of pump speed to engine speed has been required heretofore and in consequence an expensively constructed highly efficient pump has also been required to supply the required fluid power at low-speed maximum load conditions. The high efficiency is not desired at high speed because it adds unnecessary cost and unduly increases the rate of fluid flow from the pump and the difficulties of bypassing the excess fluid and dissipating the resulting frictionally induced heat.

An important object of the present invention is to avoid the foregoing problems and to provide an improved fluid pump which is particularly but not necessarily adapted for use as an automobile engine-driven power-steering pump, wherein the coupling or driving connection between the engine and the pump is selectively variable in response to the fluid pressures at opposite sides of a metering restriction or orifice in the flow path between the pump and steering motor to provide an output fluid flow through the metering orifice at a rate determined largely by the steering load, rather than solely by the engine speed.

Another object is to provide such a pump which can be economically manufactured within comparatively liberal production tolerances for operation at low engine speed, wherein the operating speed of the pump is substantially independent of the engine which powers the pump, as for example the automobile engine, and is dependent primarily on the power required from the pump, as for example the steering load. Thus during the occasional brief periods of high pump load or output demand, the pump speed may be increased sufficiently to overcome a lower than customary operating efficiency, but during low to moderate pump loads or output demand, the pump will operate at comparatively slow speeds, achieving optimum operating economy and avoiding the problem of fluid overheating with consequent loss of power and deterioration of flexible fluid conduits, among other advantages.

Other objects are to provide such a pump wherein the coupling between the pump and its power source is cooled by a heat transfer relationship with the fluid output of the pump upstream of the metering orifice or restriction; wherein the pump comprises a rotor driven by means of a variable coupling with an engine driven shaft, which in turn is rotatable in accordance with the speed of the engine; wherein the variable coupling comprises a disc-type clutch operated by means of a pressure-actuated member having a first area and an opposed smaller second area in communication respectively with the fluid pressure downstream and upstream of the metering restriction and responsive to the pressure forces on these areas for operating the variable coupling to limit the pressure differential across the restriction (and the consequent rate of fluid flow from the pump) as a function of the load on the pump measured by the fluid pressure at the pump outlet downstream of the restriction; and wherein resilient means yielding biases operation of the variable coupling in cooperation with the pressure force on said first area and in opposition to the pressure force on said second area to maintain a predetermined minimum pressure differential across said restriction (and consequent minimum fluid flow rate determined by engine speed) at zero to comparatively light loads on the pump.

Other objects of this invention will appear in the following description and appended claims, reference being had to the accompanying drawings forming part of this specification wherein like reference characters designate corresponding parts in the several views.

FIG. 1 is a schematic hydraulic circuit showing an application of the present invention.

FIG. 2 is a schematic sectional view through the axis of rotation of a pump embodying the present invention taken in the direction of the arrows substantially along the line 2—2 of FIG. 3.

FIG. 3 is a fragmentary transverse sectional view taken in the direction of the arrows substantially along the line 3—3 of FIG. 2.

FIG. 4 is a fragmentary sectional view similar to FIG. 3, taken in the direction of the arrows substantially along the line 4—4 of FIG. 2.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

FIG. 1 broadly illustrates an embodiment of the present invention comprising hydraulic pump P driven by suitable power means, including an engine E and a variably operative coupling C. The outlet 10 from the pump is connected via a control valve V with a fluid-powered mechanism which may comprise the hydraulically actuated motor M for an automobile power-steering gear. A pressure-relief valve may be employed in the circuit as shown.

In such an application operation of the valve V may be controlled by the conventional automobile steering wheel so as to control the proportion of power supplied to the motor M in accordance with a steering operation and to bypass the excess fluid, if any, discharged from the pump P to the pump return or inlet 11. This latter also receives the exhaust fluid from the motor M. The circuit shown may be employed in parallelism with the valve V and motor M shown.

Details of the pump P and the power means or coupling C for supplying power to the pump are illustrated in detail in FIGS. 2, 3 and 4 wherein the pump P comprises a cup-shaped cast housing 12 for a generally annular cam ring 13 spacing a front base plate 14 (seated against the front wall of the housing 12) from a rear pressure plate 15.

The outer circumferences of the ring 13 and plates 14 and 15 are closely confined within the inner circumference of the cylindrical walls of the housing 12 and their areas of contact with each other provide fluid seals or high resistant leakage paths. The inner circumference of the ring 13 comprises an out-of-round pumping cam surface within which rotates a power-driven rotor 16 coaxially with a pump-driving shaft 17 driven by the engine E. The base plate 14 is provided with two sets of diametrically opposed inlet ports 18, FIGS. 2 and 3, and two sets of diametrically opposed discharge ports 19, the ports 18 and 19 being suitably spaced circumferentially around the axis of rotation. The pressure plate 15 similarly carries inlet ports 18a axially opposed to the ports 18, and pressure-balancing recesses 19a axially opposed to the ports 19, so as to maintain the rotor 16 in axial pressure balance.

The ports 18 and 18a are in communication with the inlet 11 and with a reservoir 20 contained within a cup-shaped sheet metal shell 21 enclosing and spaced from the sides and rear of the housing 12 and secured to the latter at a suitable annular seal 21a. Thus the reservoir will receive leakage from the pump. The upper end of the reservoir shell 21 is provided with a filler spout 22 and a removable cap 23.

Referring to FIG. 3, the rotor 16 carries a plurality of cylindrical rollers 24 contained within a corresponding plurality of radially outwardly opening notches 24a, whereupon by rotation of the rotor 16, the rollers 24 may be operated in a conventional manner to transport hydraulic fluid from the inlet ports 18, 18a and discharge the fluid under pressure at the discharge ports 19, as for example as described in more detail in Pace et al., U.S. Pat. No. 3,366,065.

Fluid discharged from the ports 19 is conducted axially along an annular fluid flow path 25 around the shaft 17 at the regions of the plates 14, 15 and rotor 16. The path 25 leads to an upstream of a metering orifice or restriction 27 also formed within plate 15 and discharging rearwardly to a downstream pressure chamber 28, and thence to outlet 10. The chamber 28 is closed by an end closure plate 29 secured by screw action to the rear of the housing 12. A spindle 30 carried by the plate 29 extends forwardly into the chamber 28 to support a bearing 31 for an annular pressure-actuated member 32 comprising a rotatable disc having an integral tubular extension 33 coaxially receiving the rear end of shaft 17 and keyed thereto for both rotational and axial movement therewith.

The forward end of extension 33 terminates substantially flush with the forward rotor confronting face of plate 15. The outer periphery of the disc or member 32 is in sealing engagement with an inner cylindrical wall 15a of plate 15 coaxial with shaft 17 and spacing the chambers 26 and 28. Where desired, a leakage path of predetermined resistance may be provided between the outer periphery of member 32 and surface 15a to supplant part or all of the restriction 27. Preferably however, as in the present instance, the latter leakage path comprises a high resistance to fluid flow having negligible effect on the operation of the mechanism as described below. A solenoidal spring 34 is provided under compression between the spindle 30 and rear end of shaft 17 within the confines of bearing 31. Fluid pressure communication between chamber 28 and the interior of bearing 31 occupied by spring 34 is provided by an axially extending groove 35 in the spindle 30.

The forward portion of the shaft 17 is journaled in a front bearing 36 carried by housing 12 and extends axially forwardly through a seal 37 to a pulley 38 keyed to the shaft 17 for rotating the same and adapted to be power rotated by a suitable pulley belt operatively connected with the engine E, as for example by means of the engine drive shaft.

The power means for the rotor 16 also includes in addition to the shaft 17 clutch means 39 comprising a plurality of annular interacting clutch plates 40 and 41, which may comprise sheet metal stampings carried coaxially by rotor 16 and shaft 17 respectively and mutually spacing each other axially. Although the disc-type clutch 39 comprising the coupling C of FIG. 1 obtains certain advantages in consequence of its simplicity and integrated construction within the pump, other clutches or torque-converting means, which may or may not depend on frictional engagement, may be employed to provide the variably operative coupling between engine E and pump P.

As illustrated in FIG. 4, each rotor clutch plate 40 has three radial lugs 42 axially spaced circumferentially and extending radially outwardly into alternate mating grooves 43 extending axially in the inner circumference of the rotor 16. Similarly three radial lugs 44 of each clutch plate 41 extend radially inwardly into alternate grooves 45 extending axially in the outer periphery of shaft 17, FIG. 3. Radial notches 46 and 47 extend within the clutch plates 40 and 41 respectively to provide fluid communication between the radially inner and outer portions of the flow path 25, which would otherwise be separated by the clutch plates 40 and 41 when these are compacted in operation as explained below. The alternate grooves 43 and 45 which are not filled with the spline lugs 42 and 44 are available for carrying fluid axially from the discharge ports 19 to pressure chamber 26. Also as indicated in FIGS. 3 and 4, adequate clearance is provided between the shaft 17 and plates 40 and 41, and between the latter plates and the rotor 16, so that in cooperation with the grooves 43, 45 and 46, the annular space 25 comprises a low-resistance flow path.

The forward or left-hand clutch plate 40 abuts the front plate 14. The rearward or right-hand clutch plate 40 abuts the forward end of extension 33. It is accordingly apparent that when the plates 40 and 41 are pressed together axially by leftward movement of extension 33, the plates 40 and 41 will frictionally engage each other to transmit power from shaft 17 to rotor 16, thereby to rotate the latter and pump hydraulic fluid from the low pressure inlet ports 18, 18a to the high-pressure outlet ports 19, and thence via passage 25 (which includes the spaces in grooves 43 and 45, around the inner and outer peripheries of the plates 40 and 41, and within the radial ducts 46 and 47) to chamber 26, through restriction 27 to chamber 28, and thence via outlet 10 to the fluid powered mechanism or motor M via valve V which controls power to the motor M. It is also apparent that the more tightly the plates 40 and 41 are compacted axially, the greater will be the interaction therebetween and the driving force on rotor 16 for any given speed of engine E. By virtue of the type of clutch 39 shown the total axial movement of extension 33 between conditions of maximum and minimum power transfer may be negligible, amounting to a few thousandths of an inch, so that the time lag in changing the power transfer will also be negligible.

In operation of the device, when the engine E is not running, or is running at a speed less than customary idling speed, and the valve V is operated to apply no load on the motor M, such that the total output of the pump P is bypassed directly from outlet 10 to inlet 11 and substantially no back pressure exists in chamber 28, the spring 34 will urge shaft 17 and member 32 axially leftward with sufficient force to provide a minimum driving connection between shaft 17 and rotor 16. Accordingly, regardless of the pressure in chamber 28, at least a small pressure determined by the pressure drop across orifice 27 will be developed in chamber 26 whenever the engine E is operating to drive shaft 17. As the engine speed increases when the load on the pump P remains nominal, as for example when motor M is not operating, the pressure in chamber 26 applied against the left face of member 32 urges the latter rightward with increasing force against the spring 34 to decrease the interaction between the clutch plates 40 and 41 and thereby limit the maximum pressure in chamber 26 to the value required to neutralize the force of spring 34, regardless of the speed of rotation of shaft 17. Spring 34 may be eliminated if the minimum frictional drag between the clutch plates at no load idle speed conditions is adequate to supply the minimum desired pressure differential across restriction 27.

When the load on pump P is increased by operation of valve V to bypass a lesser amount of the pump output to inlet 11 and to supply the motor M with an increasing proportion of the pump output, the resulting pressure in chamber 28 will be applied against the right face of member 32 and right end of shaft 17 to urge extension 33 leftward against the clutch plates 40 and 41 and increase the driving force on rotor 16. The increased power supplied to rotor 16 will correspondingly increase the pressure in chamber 26 until the pressure differential across the orifice 27 is adequate to establish a new equilibrium condition corresponding to the pressure in chamber 28. If the speed of engine E increases while the pump P is under any preselected load, the pressure differential across orifice 27 will increase to a limiting value at which the pressure acting on the smaller left-hand area at the left face of member 32 and the left end of extension 33 sufficiently opposes the pressure acting on the larger right-hand area at the right face of member 32 and the right end of shaft 17, so that the resulting driving force on rotor 16 is just adequate at the preselected load to maintain the pressure differential across orifice 27 at said limiting value.

It is apparent that factors determining the rate of flow through orifice 27 are the dimensions of that orifice and the pressure differential thereacross, the latter in turn being functions of the ratio of said smaller left-hand and larger right-hand areas, the load on pump P measured by the force of spring 34 and the pressure in chamber 28, and the amount of force on clutch 39 required to rotate rotor 16 at various pump loads and frictional conditions of sliding and nonsliding engagement between the clutch plates 40 and 41.

Although it is obvious that the foregoing factors may be determined to obtain a wide range of performance characteristics, in an automobile power-steering pump, these factors are preferably determined so that when the pump P is under moderate to maximum steering loads of 300 p.s.i. to 1,500 p.s.i., for example, and the engine E is operating at low speeds, as for example during a parking maneuver between idle and approximately 10 to 15 m.p.h., the clutch plates will bind together positively to effect a nonslip one-to-one driving engagement between the shaft 17 and rotor 16 and the flow through orifice 27 will amount to approximately 2 or 3 gallons per minute. Under such conditions (before the plates 40 and 41 begin to slip) the rate of flow or pressure differential across orifice 27 will be direct functions of engine speed and pump load.

It may or may not be desired to have the plates 40, 41 slip at idle speed and nominal load, although spring 34 may be dimensioned to exert a minimum force on clutch 39 sufficient to effect a nonslip drive for rotor 16 under light steering loads at idle engine speed. Thus when the load is increased, the rotor 16 will already be rotating at the speed of shaft 17 and no inertial lag will be encountered, as would be the case if the rotor 16 were rotating slower than shaft 17.

At high engine speeds, the steering load never exceeds moderate pressures approximating 200 or 300 p.s.i., so that the problem of high rates of pump output at high engines speed is not encountered. Preferably the ratio between the left-hand and right-hand areas associated respectively with the pressures in chambers 26 and 28 is determined with respect to the dimensions of orifice 27 and the force on clutch 39 required to drive rotor 16 at light to moderate steering loads, so that the clutch plates 40 and 41 will slip increasingly with increasing engine speed to maintain the aforesaid pressure differential and rate of fluid flow through orifice 27 substantially constant or slightly increasing within the range of approximately 2 to 3 gallons per minute as the engine speed increases to its maximum. In this regard it is desirable that a comparatively small pressure change in chamber 26 (for any given pressure in chamber 28) will sharply change the driving force between shaft 17 and rotor 16.

We claim:

1. In combination, a fluid pressure-actuated motor, fluid-pumping means, conduit means for connecting the output of said pumping means with said motor to actuate the latter, a restriction in said conduit means between said pumping means and motor, variable power means operably coupled with said pumping means for transmitting operating power thereto, means for controlling said operating power comprising pressure-actuated means having a first area and an opposed second smaller area communicating respectively with the pressures downstream and upstream of said restriction and being responsive to increasing or decreasing pressures respectively at said first area for increasing or decreasing the power for operating said pumping means and responsive to increasing or decreasing pressures respectively at said second area for decreasing or increasing said power.

2. In the combination according to claim 1, resilient biasing means for yieldably actuating said pressure-actuated means in cooperation with the pressure at said first area and in opposition to the pressure at said second area to increase said power for operating said pumping means.

3. In combination, a fluid pressure-actuated motor, fluid pumping means, conduit means for connecting the output of said pumping means with said motor to actuate the latter, a restriction in said conduit means between said pumping means and motor, variable power means operably coupled with said pumping means for transmitting operating power thereto, means for controlling said operating power comprising pressure-actuated means responsive to increasing pressure downstream of said restriction for increasing said operating power and responsive to increasing pressure upstream of said restriction for decreasing said operating power, said pumping means including rotor means, said power means including a rotating shaft and clutch means for operatively connecting said shaft and rotor means and being selectively operable to vary the transmission of power for rotating the latter means, said pressure-actuated means including shiftable pressure-actuated clutch operating means shiftable in a first or second direction respectively for operating said clutch means to increase or decrease said power and having first and second areas responsive to said pressures respectively downstream and upstream of said restriction for urging shifting of said clutch operating means in said first or second direction respectively.

4. In the combination according to claim 3, said rotating shaft being mounted for limited shifting axially of its axis of rotation in said first and second direction, said pressure actuated means being secured to said shaft for movement therewith, and said first and second areas being axially opposed on said pressure-actuated means.

5. In a pump for supplying fluid to a fluid-actuated motor with increasing pressure as the load on said motor increases and having a low-pressure inlet port and a high-pressure discharge port, rotor means, pumping means carried by said rotor means for pumping fluid from said inlet port to said discharge port, engine-driven rotor-driving means rotatable at a variable speed, variable power-transmitting means interconnecting said rotor means and driving means and selectively operable for variably transmitting operating power to said rotor means from said driving means independently of the speed of rotation of the latter, conduit means connecting said discharge port with a high pressure outlet for said pump, a restriction in said conduit means, pressure-actuated means cooperating with said power-transmitting means and responsive to increasing pressure in said conduit means downstream of said restriction for increasing said operating power and responsive to increasing pressure in said conduit means upstream of said restriction for decreasing said operating power, said rotor means having a central opening comprising part of said conduit means, said rotor-driving means comprising an engine driven shaft rotatable within said opening, said power-transmitting means comprising clutch plates carried by said rotor means and shaft within said opening and having interacting clutch surfaces, and means for lubricating said surfaces with said fluid-comprising fluid passage grooves in said surfaces communicating with said central opening.

6. In a pump for supplying fluid to a fluid-actuated motor with increasing pressure as the load on said motor increases and having a low-pressure inlet port and a high-pressure discharge port, rotor means, pumping means carried by said rotor means for pumping fluid from said inlet port to said discharge port, engine-driven rotor-driving means rotatable at a variable speed, variable power-transmitting means interconnecting said rotor means and driving means and selectively operable for variably transmitting operating power to said rotor means from said driving means independently of the speed of rotation of the latter, conduit means connecting said discharge port with a high-pressure outlet for said pump, a restriction in said conduit means, pressure-actuated means cooperating with said power-transmitting means and responsive to increasing pressure in said conduit means downstream of said restriction for increasing said operating power and responsive to increasing pressure in said conduit means upstream of said restriction for decreasing said operating power, said rotor means having a central axial opening comprising part of said conduit means, said rotor-driving means comprising an engine-driven shaft rotatable within said opening, said power-transmitting means comprising clutch means carried by said rotor means and shaft within said opening, said pressure-actuated means comprising a piston having one area in communication with said conduit means downstream of said restriction for moving in one direction in response to increasing pressure at said one area, having an opposed area in communication with said conduit means upstream of said restriction for moving in the opposite direction in response to increasing pressure at said opposed area, and having a portion engageable with said clutch means to operate the latter to increase or decrease the transmission of said operating power upon movement of said piston in said one direction or the opposite respectively.

7. In the combination according to claim 6, said shaft being mounted for limited shifting axially of its axis of rotation, said axis extending in said one and opposite directions, said pressure-actuated means being secured to said shaft for movement therewith.

8. In the combination according to claim 7, said one area of said piston being larger than said opposed area.

9. In the combination according to claim 8, resilient biasing means yieldingly urging said pressure-actuated means in said one direction.

10. In combination, a fluid pressure-actuated motor, fluid-pumping means, conduit means for connecting the output of said pumping means with said motor to actuate the latter, a restriction in said conduit means between said pumping means and motor, variable power means operably coupled with said pumping means for transmitting operating power thereto, means for controlling said operating power comprising pressure-actuated means responsive to increasing pressure downstream of said restriction for increasing said operating power and responsive to increasing pressure upstream of said restriction for decreasing said operating power, said pressure-actuated means comprising shiftable means coupled with said power-transmitting means and having one area exposed to said pressure downstream of said restriction to be shifted in one direction to increase said operating power and having an opposite area exposed to said pressure upstream of said restriction to be shifted in opposition to said one direction to decrease said operating power.

11. In the combination according to claim 10, said variable power-transmitting means including an engine and friction clutch means for effecting a variable frictional driving engagement between said engine and pumping means, said clutch means having a portion engageable by said shiftable means to increase or decrease said driving engagement upon shifting of said shiftable means in said one direction or the opposite respectively.

* * * * *